(12) United States Patent
Graeff (10) Patent No.: US 6,578,451 B1
(45) Date of Patent: Jun. 17, 2003

(54) REMOTE BOLT INSTALLATION TOOL (75) Inventor: Kurt R. Graeff, Windsor, CT (US)

(73) Assignee: Westinghouse Electric Company LLC, Pittsburgh, PA (US)

( * ) Notice: Subject to any disclaimer, the term of this patent is extended or adjusted under 35 U.S.C. 154(b) by 188 days.

(21) Appl. No.: 09/705,989

(22) Filed: Nov. 3, 2000

(51) Int. Cl.[7] .............................................. B25B 33/00
(52) U.S. Cl. ............................. 81/55; 81/451; 81/57.31
(58) Field of Search ................................ 81/13, 54, 55, 81/57.31, 451, 57.37, 454, 455, 456

(56) References Cited

U.S. PATENT DOCUMENTS

| | | | | |
|---|---|---|---|---|
| 420,431 A | * | 2/1890 | Bartlett | 81/451 |
| 744,930 A | * | 11/1903 | McDaniel | 81/13 |
| 2,040,713 A | * | 5/1936 | Shaffer | 81/55 |
| 3,901,298 A | * | 8/1975 | Eby | 81/125 |
| 4,581,962 A | | 4/1986 | Marbourg | |
| 4,630,510 A | * | 12/1986 | Belanger | 81/55 |
| 4,836,062 A | | 6/1989 | LaTorre | |
| 4,991,280 A | | 2/1991 | Reimer et al. | |
| 5,052,249 A | * | 10/1991 | Go | 81/55 |

* cited by examiner

Primary Examiner—James G. Smith (57) ABSTRACT

Fastener gripping apparatus (10) can be used in connection with a shaft (14) having a driver portion (80) adapted to engage a bolt (3). The apparatus is used to move the bolt between an uninstalled condition, and an installed condition in a structural member (8). The apparatus can include a chassis (12) having a first end (22), a second end (24), and a passage (32) extending therebetween. The shaft can be positioned in the passage with the driver portion extending from the second end. A retainer (16) can be connected to the chassis, having a retaining end (54) adjacent the second end and moveable between a closed position and an open position. A contact surface (64) can be on said retaining end and positioned to hold the fastener in engagement with the driver portion when the retainer is in the closed position. A cam surface (62) can be on said retaining end, positioned to engage the structural member to move the retainer from the closed position to the open position when the fastener is moved from the uninstalled condition to the installed condition.

21 Claims, 8 Drawing Sheets

REMOTE BOLT INSTALLATION TOOL

BACKGROUND

The field of this invention relates to the installation of fasteners. More particularly, this invention relates to apparatus for installing fasteners when the human operator and the hole at which the fastener will be installed are remotely located from each other. While the invention may be adapted for use in virtually any environment, it can be particularly advantageous for use in nuclear reactors. In such an environment, it may be desirable to have a human operator position himself some distance from a fastener installation hole to reduce the amount or possibility of radiation exposure, or because the geometrical configuration of the structure makes it difficult or impossible for the human operator to place himself in close proximity to the fastener installation hole. In these situations, a device is needed that can grip the fastener, install the fastener at a remote location, and release from the fastener so that the tool can be removed. The same tool should also be capable of removing the fastener by a human operator positioned at the remote location.

Figure 1:
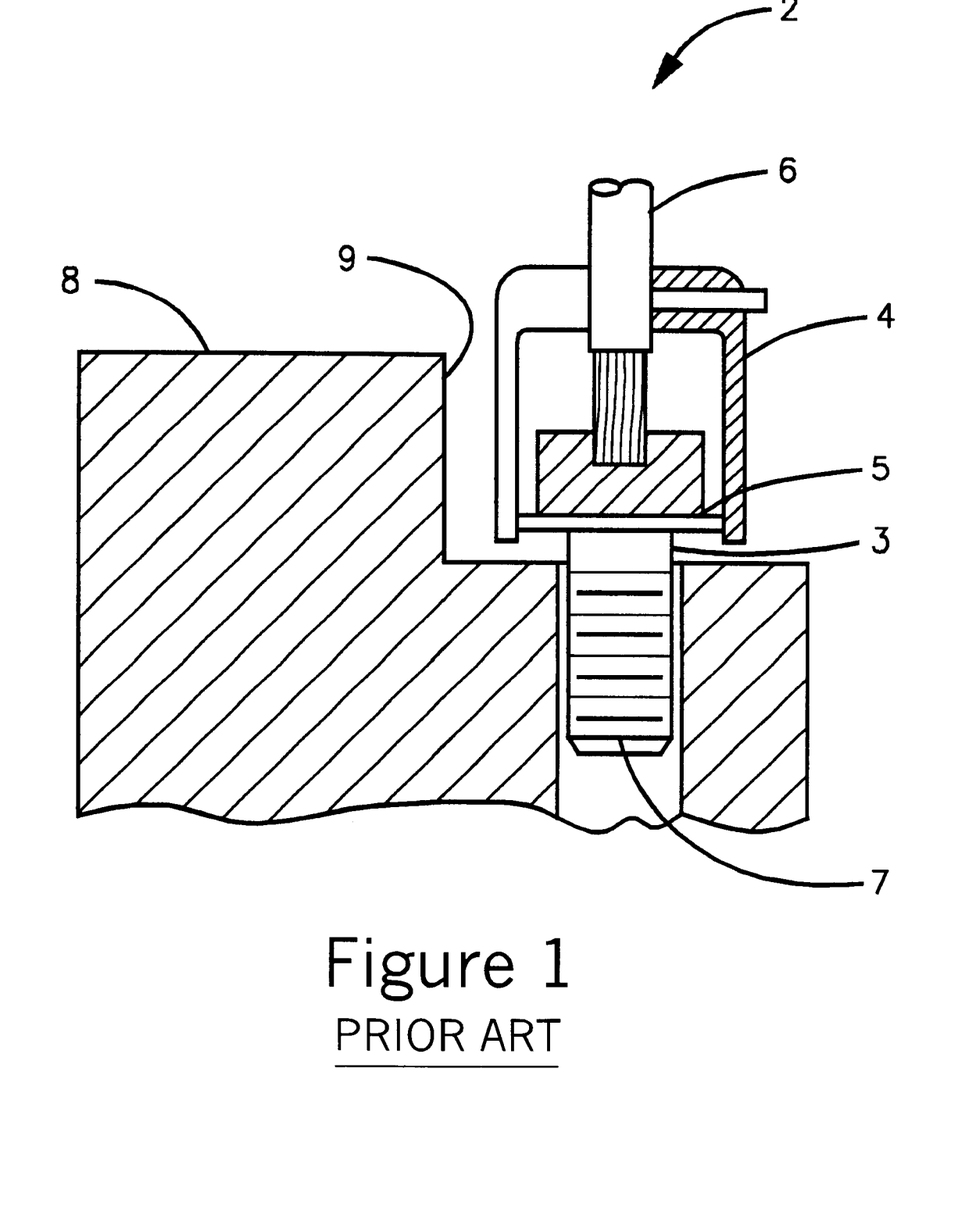
FIG. 1 is a side elevation view, in partial cross section, showing the installation of a fastener using an existing device.

An existing tool (2) shown in FIG. 1 has been used to install fasteners such as a bolt (3) into a remotely located hole in a nuclear reactor. This tool includes a plurality of resilient fingers (4) which grip the washer (5) installed on the bolt. A beam (6) is connected to the fingers and extends between the human operator (not shown) and the installation hole (7). This length can often exceed that found on conventional fastener installation tools such as screwdrivers, and in some applications can measure as much as twenty to thirty feet. The effective use of this tool depends on the human operators' ability to position the tool without excess movement, which can cause the fastener to prematurely disengage from the tool. This limitation can become more and more pronounced with increasing distance between the human operator and the fastener installation hole. Also, the fingers (4) may interfere with the structural member (8) when it is desired to remove the tool from the fastener. Specifically, the fingers may spread outward during removal, and their movement can be blocked by the surface (9) on the structural member (8). When this occurs, the fingers can become wedged between the washer (5) and the surface (9), thus requiring further effort to remove the tool. Additionally, it has been found that this tool is not well suited for use when only a fastener will be installed, instead of a fastener and a washer.

SUMMARY

Fastener gripping apparatus is provided which can be used in connection with a shaft having a driver portion. The apparatus can grip a fastener, position the fastener at a remote location, and move the fastener from an uninstalled condition to an installed condition in a structural member. When the fastener is moved towards the installed condition, the apparatus detaches from the fastener for removal from the installation site. The apparatus can be used to install a fastener with or without associated hardware, such as washers. Moreover, the apparatus can also be used to move a fastener, with or without washers, from the installed condition to the uninstalled condition.

The apparatus can include a chassis with a first end, a second end, and a passage extending between the ends. The shaft can be positioned in the passage with the driver portion extending from the second end. A retainer that is moveable between a closed position and an open position can be connected to the chassis, and includes a retaining end positioned adjacent the second end. A contact surface or means on the retaining end is positioned to hold the fastener against the driver portion when the retainer is in the closed position. A cam surface or means is positioned on the retaining end to engage the structural member to move the retainer from the closed position to the open position when the fastener is moved from the uninstalled condition to the installed condition.

The retainer can include a pivot end pivotally connected to the chassis, so that the retainer pivots about the pivot end when moving between the open position and the closed position. A biasing means normally biases the retainer towards the closed position. The biasing means can be a spring extending between the chassis and the retainer.

The retainer can include a slideable member for adjusting a position of the contact surface relative to the driver portion and substantially in the directions of a longitudinal axis of the passage. The slideable member may be the retaining end.

BRIEF DESCRIPTION OF THE DRAWINGS

FIG. 5b is a end view of the configuration shown in FIG. 5a;

DETAILED DESCRIPTION

Figure 2:
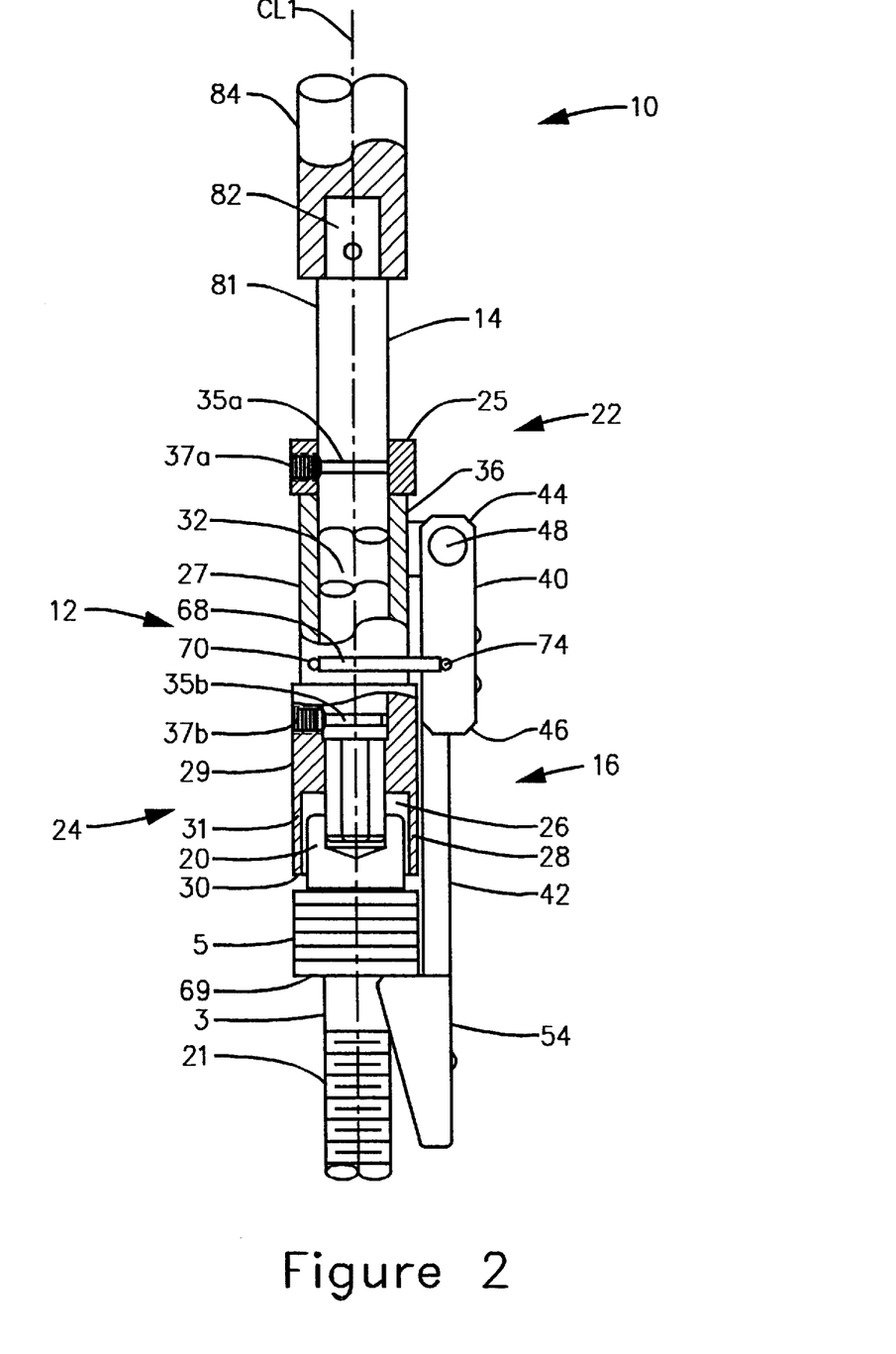
FIG. 2 is a side elevation view, shown in partial cross section, of an embodiment having a shaft installed in a chassis and a fastener receiving cavity at one end.

FIG. 2 shows an embodiment of a fastener gripping apparatus (10). The apparatus includes a chassis (12), shaft (14), and retainer (16). The apparatus can be used to grip a fastener and associated hardware such as, for example, bolt (3) and washers (5). Typically, bolt (3) will include a head portion (20) and threaded portion (21). As used herein, the term "fastener" may include a fastener such as a bolt, with or without associated hardware such as washers.

The chassis (12) has a first end (22) and an oppositely positioned second end (24). The chassis can included a collar clamp (25), body (27), and skirt clamp (29). These items are aligned with each other along longitudinal centerline (CL1) with an elongated passage (32) extending from the first end to the second end. The first end can comprise the collar clamp (25) and the second end can comprise the skirt clamp (29), with each of these items positioned on opposite sides of body (27). The skirt clamp (29) can include a fastener receiving cavity (26) defined by a wall (28), floor surface (31), and outermost surface (30).

Figure 4:
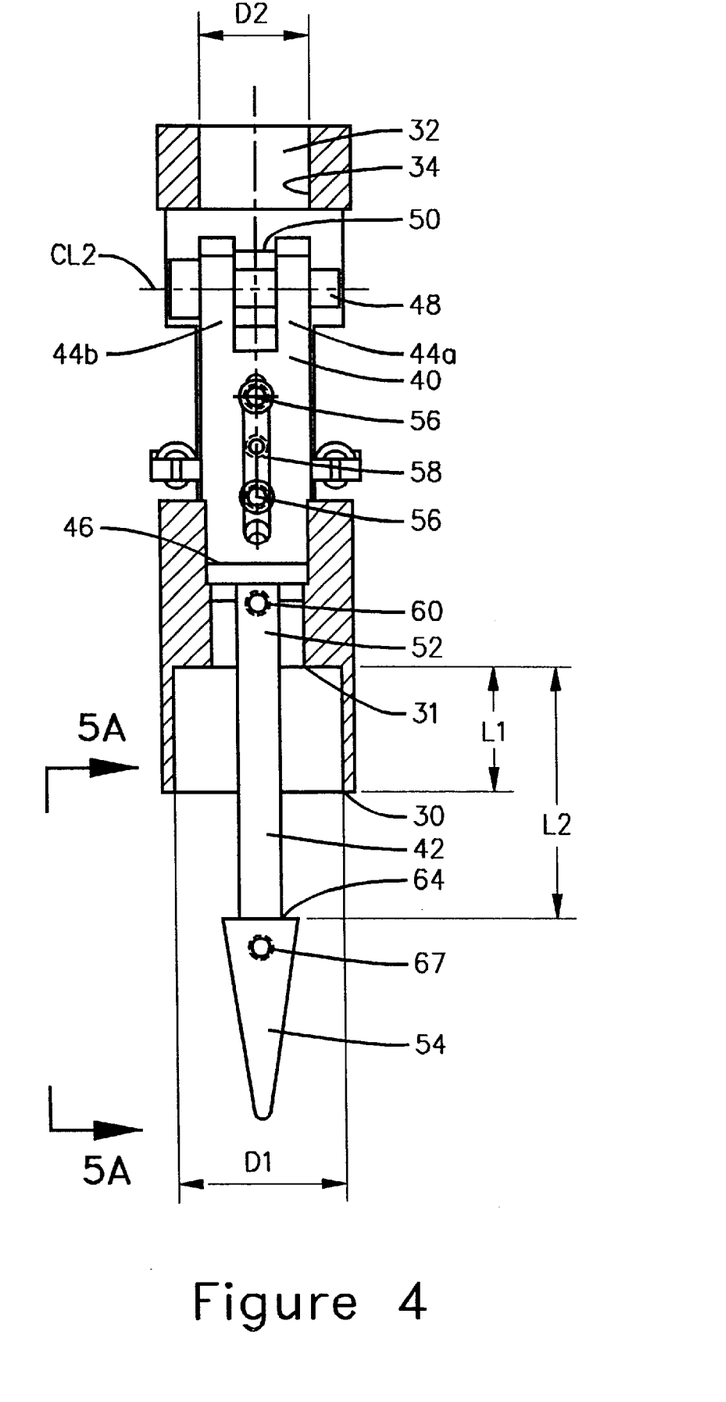
FIG. 4 is a top elevation view, shown in partial cross section, of the embodiment shown in FIG. 2 with the shaft removed.

As best seen in FIG. 4, the size of the cavity can be selected to provide an internal diameter (D1) and a length (L1). The lengths of (D1) and (L1) can be predetermined by the size of the bolt (3) and washers (5), if any, that the apparatus will be used to install. The elongated passage (32) can be circular having a passage wall (34) with a diameter (D2). The diameter (D2) will typically be predetermined by the size of the shaft (14), which in turn can depend on the size of the fastener to be installed. The configuration of the fastener receiving cavity (26) can be varied as desired to accommodate fasteners with different head configurations. For example, if a fastener such as an oval phillips head (not shown) is used, the cavity can be made with an oval configuration corresponding to that of the fastener head.

Referring back to FIG. 2, the shaft (14) is shown installed in the passage (32) and shares centerline (CL1) with the passage. The shaft (14) may include a pair of grooves (35a) and (35b), with groove (35a) positioned adjacent collar clamp (25) and groove (35b) positioned adjacent skirt clamp (29). Set screw (37a) is installed into groove (35a) to retain the collar clamp (25) onto the shaft, and set screw (37b) is installed into groove (35b) to retain the skirt clamp (29) on the shaft. With the set screws thus installed, the body (27) is captured between the collar clamp (25) and the skirt clamp (29). The shaft (14) is thus constrained from translating in the longitudinal directions along centerline (CL1), relative to the body portion (27) of the chassis (12), but is free to rotate relative to the body (27). Additional means known to skilled artisans can be used to restrain the shaft from moving in the longitudinal direction relative to the chassis (12), such as, for example, spring loaded detent balls (not shown) extending from the chassis and into the grooves (35a) and (35b), or drill point indentations that can accommodate set screws or detent balls.

Retainer (16) can be connected to the external surface (36) of the chassis (12). The retainer can comprise a pivot block (40) and a lever arm (42). The pivot block can include a pivot end (44) and a slot end (46). As shown in FIG. 4, the pivot end can comprise two tabs (44a) and (44b) which are positioned on opposite sides of stanchion (50). A pin (48) can extend through the tabs and stanchion to pivotally connect the pivot block to the stanchion, allowing the pivot block (40) to pivot between open and closed positions about the centerline (CL2) of the pin (48) in the pivot end (44).

Figure 3:
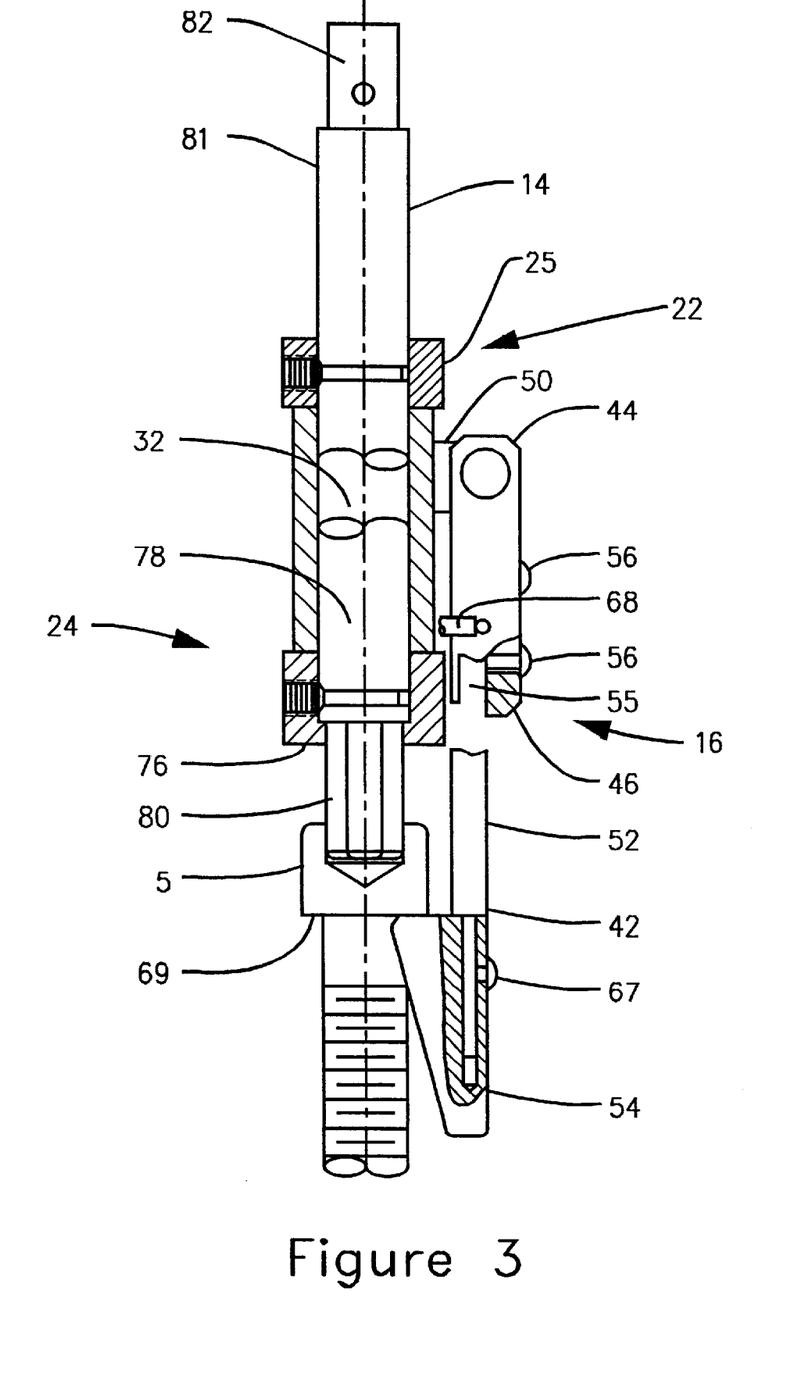
FIG. 3 is a side elevation view, shown in partial cross section, of an embodiment that does not have a fastener receiving cavity at one end.

As seen with reference to FIGS. 3 and 4, the lever arm (42) of retainer (16) can include an insertion end (52) and a retaining end (54). The insertion end is inserted into a slot (55) at the slot end (46) of the pivot block (40), and is free to slide to desired locations within the slot. When the lever arm is at a desired location within the slot, screws (56) can be inserted through adjustment groove (58) and into the series of adjustment holes (60), and then tightened to secure the lever arm (42) in position within the pivot block.

Figure 5A:
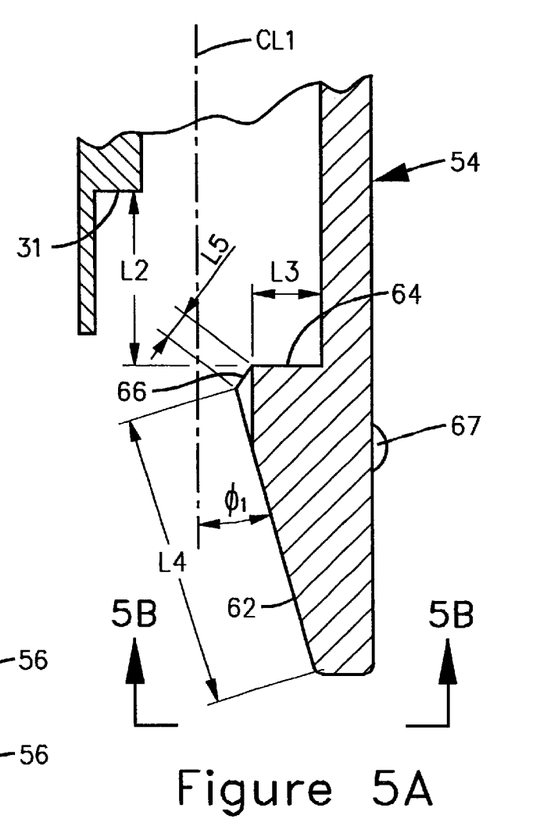
FIG. 5a shows a side view of a configuration of a lever arm retaining end.
Figure 5B:
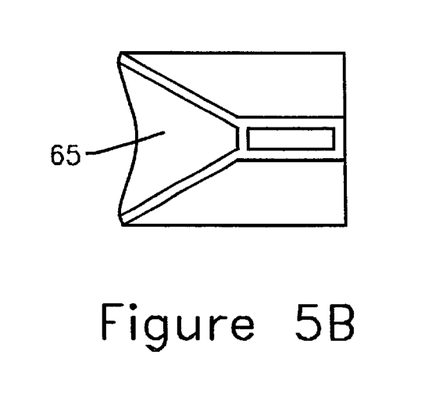

The configuration of the retaining end (54) of the lever arm (52) is shown in greater detail in FIGS. 5a and 5b. The retaining end includes a cam surface (62), contact surface (64), and bevel surface (66). The cam surface (62) includes a scalloped or concave area (65) at the junction with the bevel surface (66), to facilitate sliding of these surfaces over the fastener.

The contact portion (64) can be positioned a length (L2) from the cavity floor surface (31) of the second end (24). Length (L2) is adjustable by slideably positioning the lever arm (42) within the pivot block (40). Alternatively, the retaining end can be constructed so that it is slideably engaged to the lever arm to adjust distance (L2), and held in the desired position on the lever arm by a fastener such as set screw (67). The desired length (L2) can be predetermined and can depend upon the fastener configuration to be installed.

The contact portion has a length (L3) and can lie at a right angle to centerline (CL1), and is long enough to reach out to and contact an underside surface (69) of the bolt (3) and or washers (5) that are positioned on the shaft (14) at the desired predetermined distance. The cam surface (62) has a length (L4) and can lie at cam angle Ø1 with respect to centerline (CL1). The bevel surface has a length (L5) and connects the contact portion to the cam surface. The lengths (L5), (L4), (L3) and the angle Ø1 can be predetermined and can vary depending upon the size and configuration of the fastener to be installed as well as the structural member into which the fastener will be installed.

In FIG. 2 the retainer is shown in a closed position. In the closed position, the lever arm (42) can be substantially parallel to the centerline (CL1) and the retaining end (54) can be adjacent the second end (24). A biasing means such as a spring can be used to normally bias the retainer into the closed position. For example, spring (68) can have one end attached to a stud (70) on the chassis and the opposite end attached to a stud (74) on the retainer.

The shaft includes a driver or head end (78) with driver portion (80) that is configured to mate with the fastener head (5). The configuration can be, for example, a phillips screwdriver or alien head style design. The shaft is installed with the driver portion (80) extending from a surface found on the second end (24). Such surface may be the end surface (76) as shown in FIG. 3, or the cavity floor surface (31) as shown in FIG. 2.

The opposite end (81) of the shaft extends outward from the first end (22) of the chassis (12). Shaft opposite end (81) terminates in a lug (82) which can be connected to a force transmitting member (84). The force transmitting member (84) can be any desired length, and such length can be predetermined based upon the distance between an operator and the site at which the fastener needs to be installed. Alternatively, the shaft (14) may extend for the necessary distance between the operator and the installation site, in lieu of using force transmitting member (84).

Figure 6:
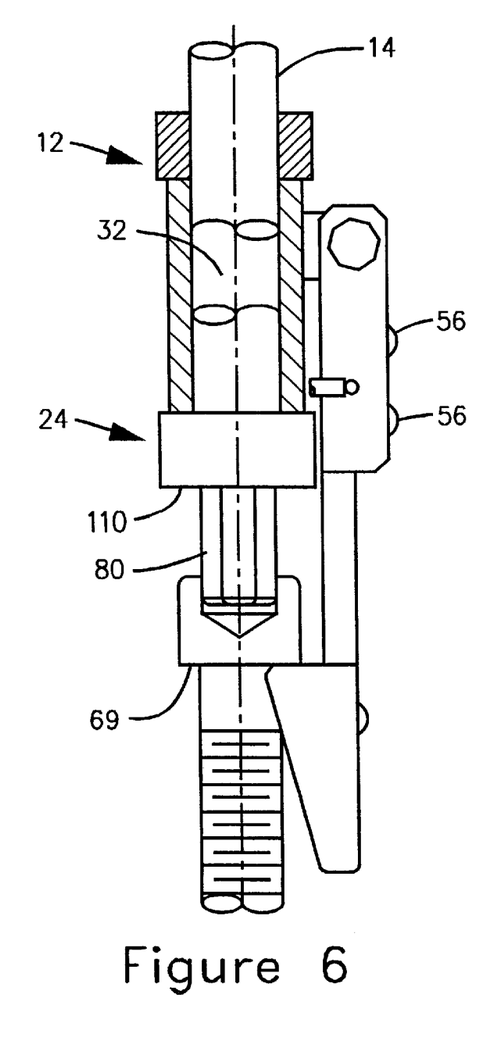
FIG. 6 is a side view of an alternative embodiment shown in partial cross section.

An alternative embodiment is shown in FIG. 6, wherein the chassis (12) comprises a single unitary member. In this embodiment, the shaft (14) can be inserted into passage (32) through second end (24). A shoulder (110) is affixed to the shaft to prevent the shaft from sliding completely through the chassis, and to position driver or head end (80) in an extended position from second end (24).

Having described the construction of the apparatus, the use of such apparatus will now be described with reference to FIGS. 7a, 7b, and 7c, which depict the apparatus at various stages when used to move a fastener between uninstalled and installed conditions in a structural member (8).

The configuration of the bolt (3) and washer 5 combination that needs to be installed into a structural member (8) is determined, as is the distance between the operator (not shown) and the installation hole (7).

A chassis is provided with a shaft (14) that includes a driver portion (80) with a geometry corresponding to that of the fastener head, so that the driver portion can mate with fastener to turn the fastener to move it between the installed and uninstalled conditions.

The contract surface (64) is moved into a position at a length (L2) which places it adjacent the second end (24) and driver portion (80) such that it will engage the fastener to hold the fastener against the driver portion (80). The position of the contact surface may be adjusted to the desired position by sliding the lever arm (42) within the pivot block (40), and/or by sliding the retaining end (54) along the lever arm when the contact surface is in position against the fastener. This adjustment of position can move the contact surface (64) in either linear direction parallel to centerline (CL1), when the retainer is in the closed position. The lever arm or retaining end, as the case may be, is fixed into position by tightening screws (67) and/or (56).

A force transmitting member (84) is connected to lug (82). The force transmitting member has a sufficient length for an operator positioned at a remote location to move the apparatus and fastener to the installation hole (7) in the structural member (8). Alternatively, if the shaft has a sufficient length to extend from the installation hole (7) to the operator, a force transmitting member may not be needed.

Figure 7A:
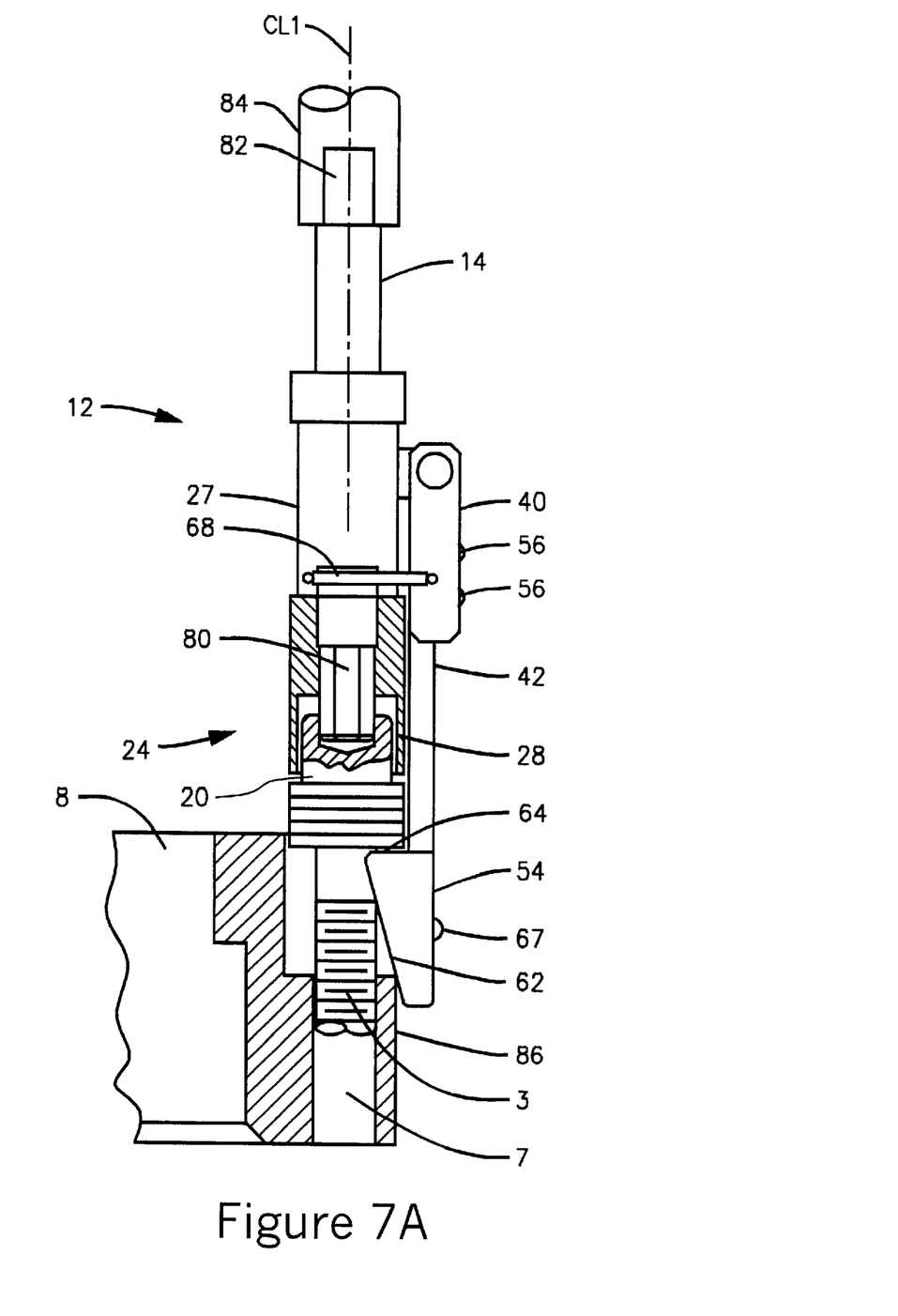
FIG. 7a shows the embodiment of FIG. 2, in partial cross section gripping a fastener in an uninstalled condition.

FIG. 7a shows the apparatus with the fastener in an uninstalled condition. As shown, the fastener is partially inserted into the hole (7), but the uninstalled condition can also include the condition wherein the fastener has not yet entered the hole. When the fastener is in an uninstalled condition, the retainer can be in the closed position with the contact portion (64) retaining the fastener on the driver portion (80). Cam surface (62) is positioned adjacent edge (86) on the structural member.

The operator begins to rotate the shaft (14), relative to the body (27) of the chassis (12) and along its central longitudinal axis (CL1), to begin screwing the fastener into the installation hole. This draws the apparatus closer to the installation hole with the cam surface (62) slideably engaging the structural member.

Figure 7B:
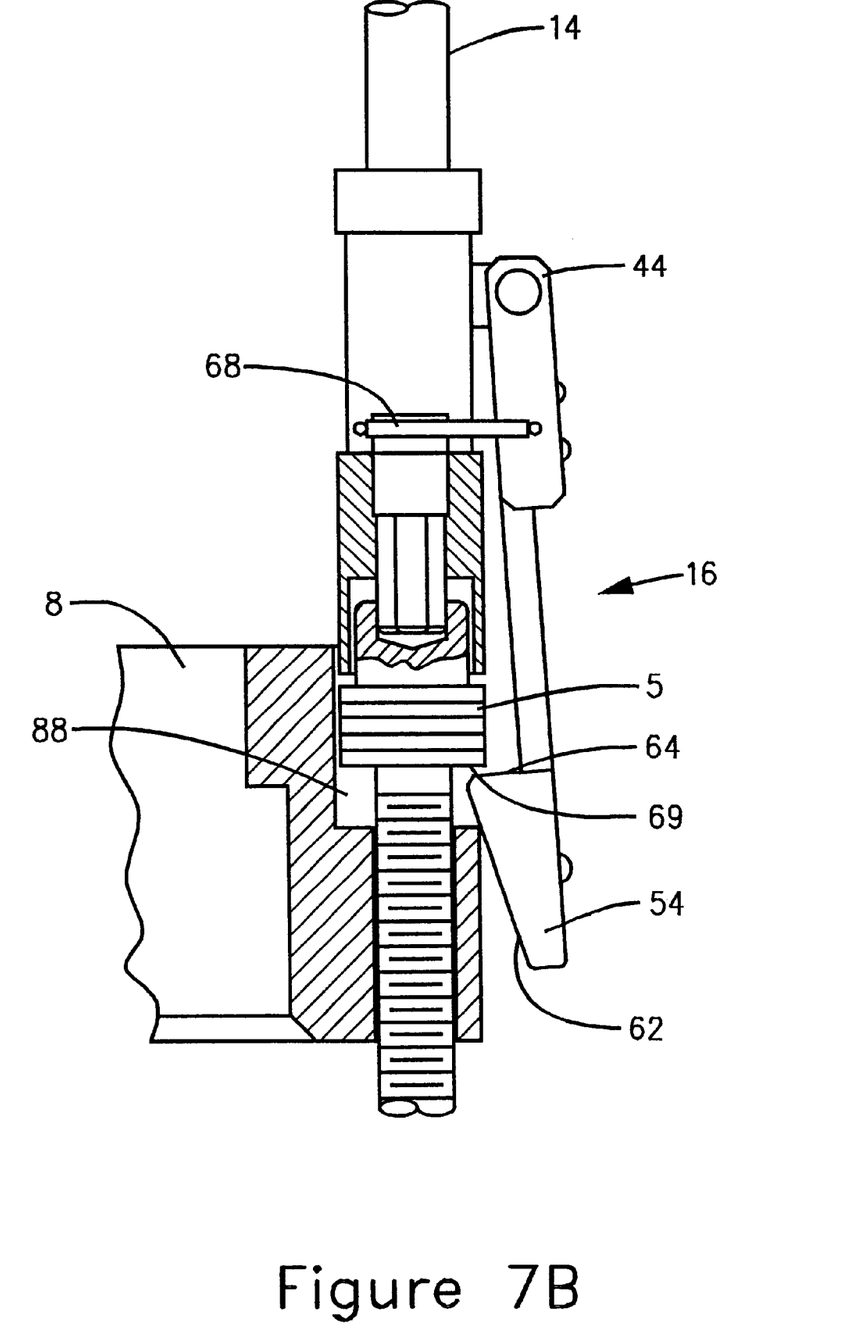
FIG. 7b shows the embodiment of FIG. 2, in partial cross section with the fastener in a partially installed condition.

FIG. 7b shows the fastener in a partially installed condition. The cam surface's (62) sliding engagement with the structural member (8) causes the retainer (16) to pivot or rotate about its pivot end (44) towards an open position. This movement causes the contact surface to disengage or release from underside surface (69) of washers (5). While the fastener is in this partially installed condition, a gap (88) exists between the structural member (8) and the washers (5), and portions of the retaining end (54) reside in the gap.

Figure 7C:
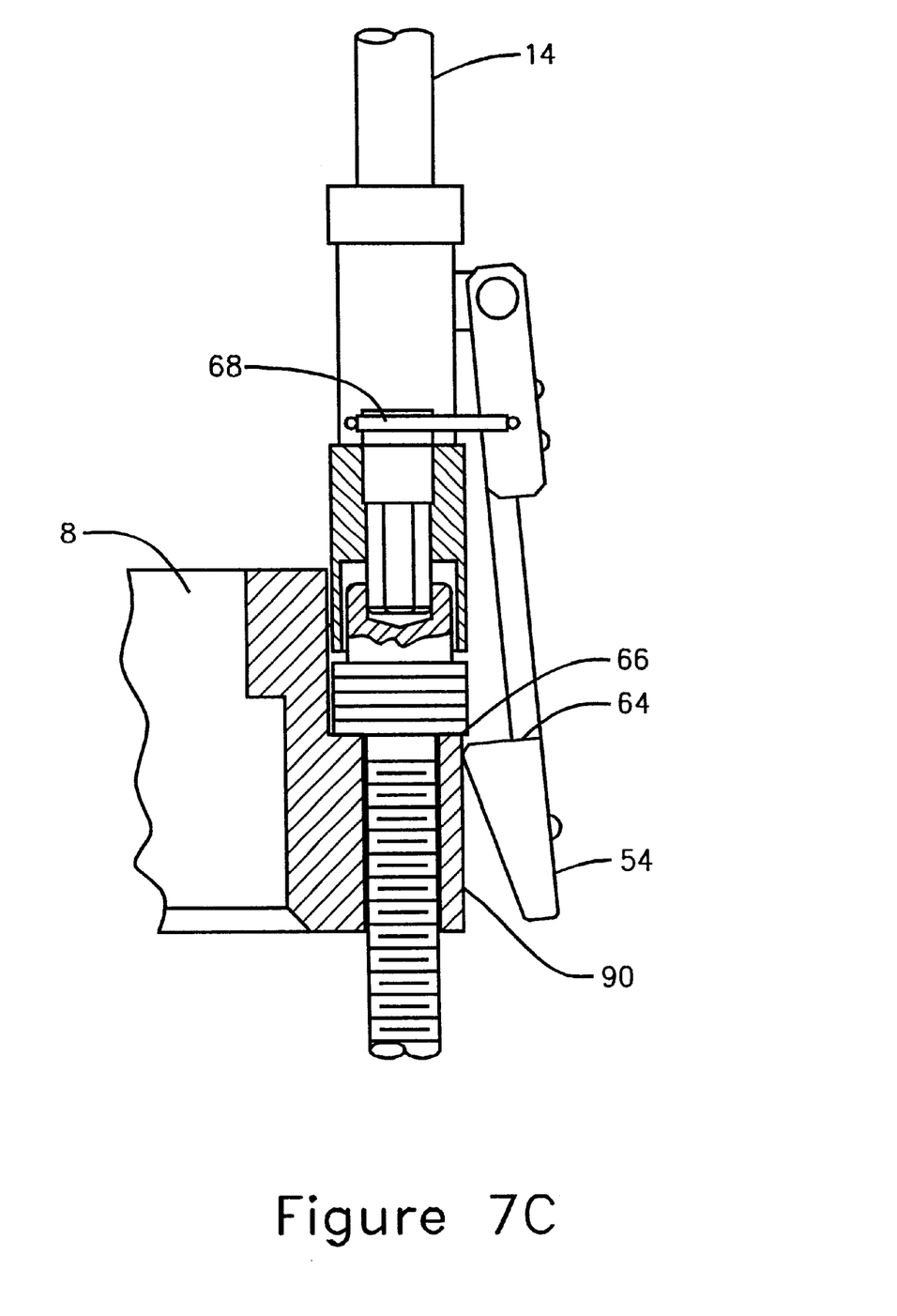
FIG. 7c shows the embodiment of FIG. 2, in partial cross section with the fastener in an installed condition.

FIG. 7c shows the fastener in an installed condition, wherein the fastener is fully seated within mounting hole (7) and the gap (88) is closed. The retaining end (54) lies alongside the vertical surface (90) of the structural member (8), and the apparatus can be removed from the installation site by lifting it vertically. If portions of washers (5) extend over the vertical wall (90), the bevel surface (66) with scallop area (65) will ride over the washers to prevent the tool from becoming entangled on the washers. It should be noted that the washers (5) are held firmly in place by the bolt (3) at this point.

To remove a fastener, the installation process is reversed. The operator begins to rotate shaft (14) which loosens the bolt (3) from the structural member (8) and begins moving the bolt upward. When the bolt is moved upward it releases the pressure from the washers (5), so that retaining end (54) can lift the washers. As the fastener moves from a fully installed condition shown in FIG. (7c) to the partially installed condition shown in FIG. (7b), the contact surface (64) is moved into the gap (88) by spring (68), which normally biases the retainer into the closed position. When the fastener is in the uninstalled condition shown in FIG. (7a), the contact surface (64) holds the fastener against driver portion (80) so that the fastener can be removed from the installation site.

Although the invention has been described in detail, with respect to apparatus and method embodying aspects of the invention, it is to be understood that the description is intended by way of illustration and example only, and is not to be taken by way of limitation. Accordingly, the spirit and scope of the invention are to be limited only by the terms at the appended claims.

What is claimed:

1. Fastener gripping apparatus for use in connection with a shaft, the shaft having a driver portion thereon adapted to engage a fastener to move the fastener between an uninstalled condition, and an installed condition in a structural member, comprising:

a. a chassis having a first end, a second end, and a passage extending therebetween, said passage adapted to support the shaft with the driver portion extending from said second end;

b. a retainer connected to said chassis having a retaining end adjacent said second end and moveable between a closed position and an open position;

c. a contact surface on said retaining end positioned to hold the fastener in engagement with the driver portion when said retainer is in the closed position;

d. a cam surface on said retaining end, positioned to engage the structural member to move said retainer from the closed position to the open position when the fastener is moved from the uninstalled condition to the installed condition.

2. Apparatus as claimed in claim 1, wherein said retainer comprises a pivot end pivotally connected to said chassis, whereby said retainer pivots about the pivot end when moving between the open position and the closed position.

3. Apparatus as claimed in claim 2, comprising a spring that normally biases said retainer towards the closed position.

4. Apparatus as claimed in claim 3, wherein said spring extends between said chassis and said retainer.

5. Apparatus as claimed in claim 3, wherein said retainer includes a slideable member for adjusting a position of said contact surface, relative to said second end.

6. Apparatus as claimed in claim 5, wherein said slideable member comprises said retaining end.

7. Apparatus for holding a fastener, and for moving the fastener between an uninstalled condition, and an installed condition in a structural member, comprising:

a. a chassis, a shaft, and a retainer;

b. said chassis comprising a first end and a second end;

c. said shaft connected to said chassis, and having a driver portion extending from a surface on said second end adapted to mate with the fastener;

d. said retainer connected to said chassis and moveable between a closed position and an open position;

e. said retainer having a contact means for holding a fastener against said driver portion when said retainer is in a closed position, and for releasing the fastener when said retainer is in an open position;

f. a cam means for moving said retainer from the closed to the open position when the fastener is moved from the uninstalled condition to the installed condition.

8. Apparatus as claimed in claim 7, comprising a passage extending between said first and said second ends, wherein said shaft is rotatably mounted in at least part of said chassis.

9. Apparatus as claimed in claim 8, wherein said retainer comprises a retaining end and a pivot end, wherein said contact means is positioned on said retaining end and said pivot end is pivotally connected to said chassis, whereby said retainer pivots about said pivot end when moving between the closed and the open positions.

10. Apparatus as claimed in claim 9, comprising a biasing means that normally biases said retainer towards the closed position.

11. Apparatus as claimed in claim 10, wherein said retainer includes a slideable portion for adjusting a position of said contact means relative to said driver portion.

12. Apparatus as claimed in claim 11, wherein said slideable portion comprises said retaining end.

13. Fastener gripping apparatus for gripping a fastener and moving the fastener between an uninstalled condition, and an installed condition in a structural member, comprising:
   a. a chassis, a shaft, and a retainer;
   b. said chassis having a first end, a second end, and a passage extending therebetween;
   c. said shaft rotatably positioned in said passage and having a driver portion extending from a surface on said second end, said driver portion adapted to engage the fastener;
   d. a retainer connected to an external surface of said chassis and having a retaining end adjacent the driver portion, said retainer normally biased into a closed position and moveable between the closed position and an open position;
   e. a contact surface on said retaining end positioned to hold the fastener in engagement with said driver portion when said retainer is in the closed position;
   f. a cam surface on said retaining end, positioned at a cam angle to slidingly engage the structural member and move said retainer from the closed position to the open position when the fastener is moved from the uninstalled condition to the installed condition.

14. Apparatus as claimed in claim 13, wherein said retainer comprises a pivot end spaced away from said retaining end, said pivot end pivotally connected to said chassis, whereby said retainer pivots about said pivot end when moving between the open position and the closed position.

15. Apparatus as claimed in claim 14, comprising a spring that normally biases said retainer towards the closed position.

16. Apparatus as claimed in claim 15, wherein said spring extends between said chassis and said retainer.

17. Apparatus as claimed in claim 15, wherein said retainer includes a slideable member for adjusting a position of said contact surface relative to said driver portion.

18. Apparatus as claimed in claim 17, wherein said slideable portion comprises said retaining end.

19. Apparatus as claimed in claim 17, wherein said second end comprises a skirt forming a fastener receiving cavity.

20. Apparatus as claimed in claim 17, comprising means for preventing translation of said shaft, relative to at least a portion of said chassis, in at least one direction of a longitudinal axis of said shaft.

21. Apparatus as claimed in claim 17, wherein a force transmitting member is connected to an end of said shaft opposite said driver portion.

\* \* \* \* \*